July 12, 1938.  E. A. JOHNSTON  2,123,533
TRACTOR WHEEL
Filed Nov. 17, 1933  2 Sheets-Sheet 1

July 12, 1938.   E. A. JOHNSTON   2,123,533
TRACTOR WHEEL
Filed Nov. 17, 1933   2 Sheets-Sheet 2
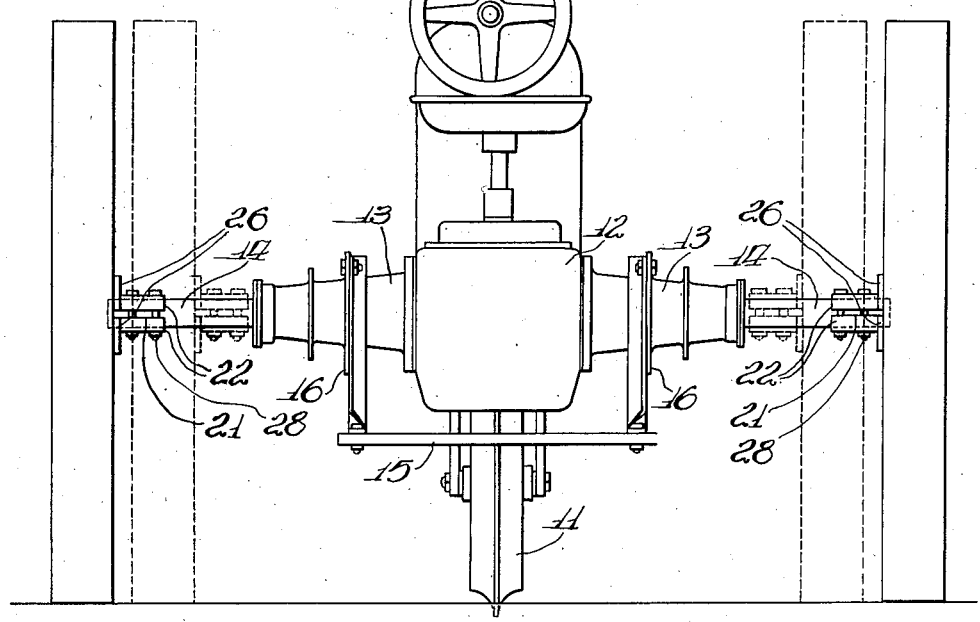
Fig. 2
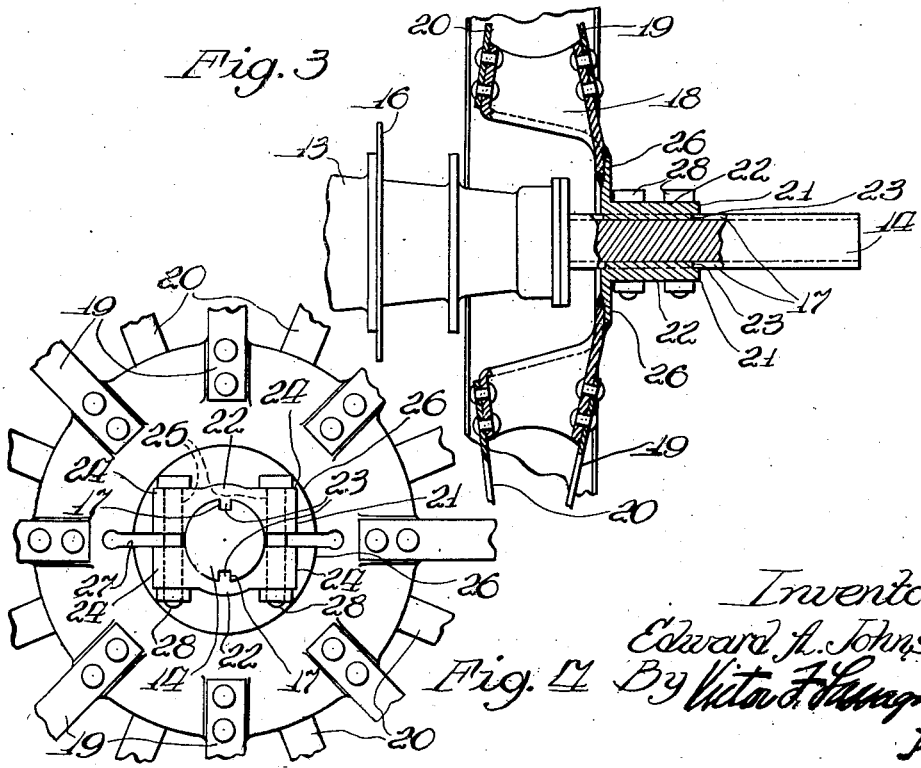
Fig. 3
Fig. 4
Inventor
Edward A. Johnston
By Victor F. Hauger
Atty.

Patented July 12, 1938

2,123,533

UNITED STATES PATENT OFFICE 2,123,533

TRACTOR WHEEL

Edward A. Johnston, Chicago, Ill., assignor to International Harvester Company, a corporation of New Jersey Application November 17, 1933, Serial No. 698,446

1 Claim. (Cl. 287—52.03)

This invention relates to a wheel for adjustable tread tractors. More particularly it relates to a clamping hub for adjusting a traction wheel axially of an axle on which it is mounted.

There are many tractors in use at the present time of the so-called general purpose type; that is, the tractors are readily adapted to a wide variety of farm uses. For certain work it is desirable to have a narrow tread tractor. For other uses, particularly when implements are mounted on the tractor for row crop work, it is necessary to have a wide tread.

The principal object of the present invention is to provide an improved wheel hub construction particularly adapted for tractors with adjustable tread. Another object is to provide such a wheel which can be set firmly and can be easily and quickly loosened, so that the tread of the tractor may be adjusted. These objects and others which will be apparent are accomplished by a construction such as illustrated in the drawings, in which:

Figure 2 is a rear elevation of the same machine shown in Figure 1, the dotted lines showing the narrowest tread which can be obtained without reversing the wheels on the axis;

Figure 3 is an enlarged detail showing in section the axle and the center portion of the wheel; and, Figure 4 is an end elevation of the same portion of the machine shown in Figure 3.

Figure 1:
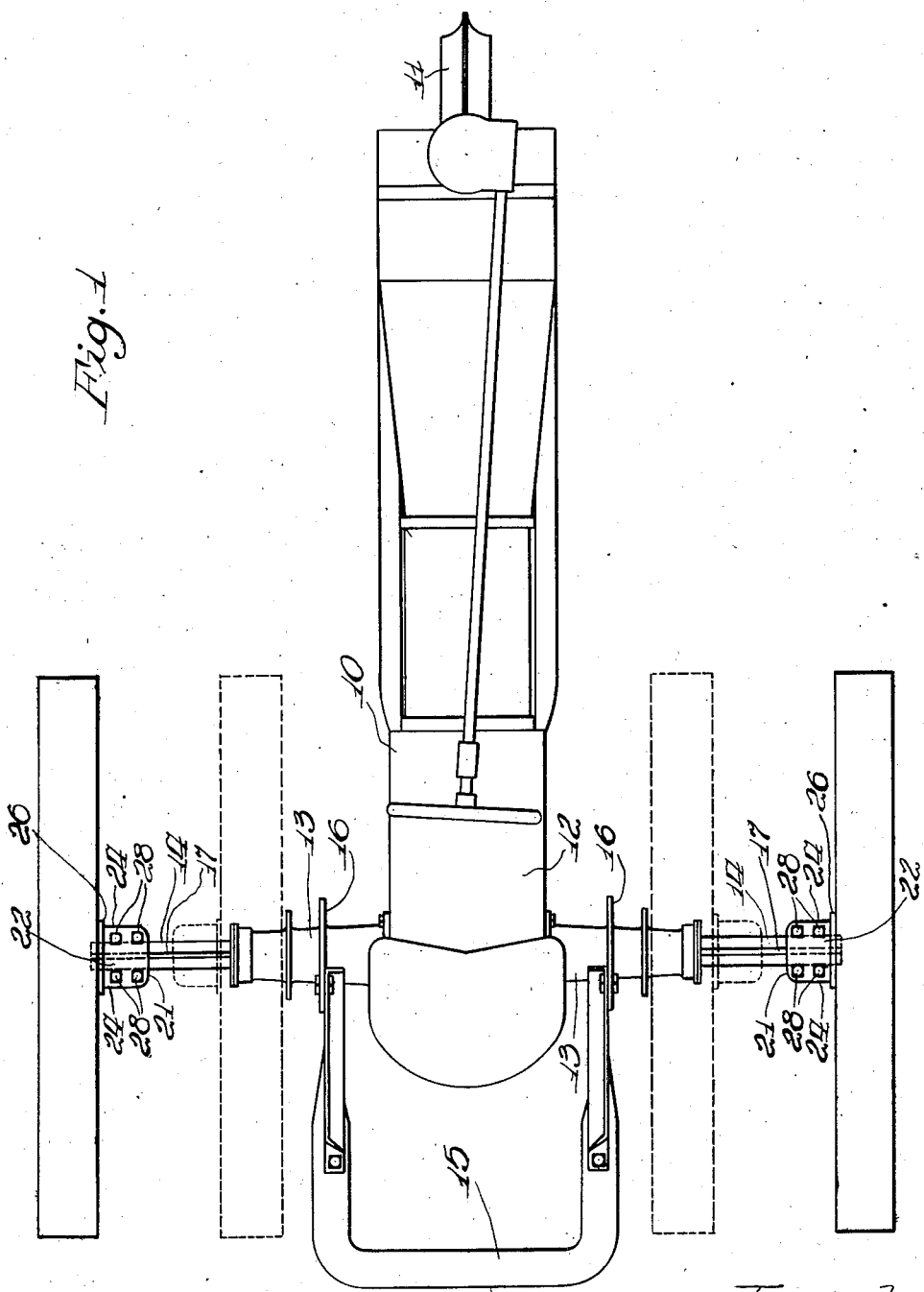
Figure 1 is a plan view of a tricycle type of tractor showing in full lines the wheels in a wide tread position and in dotted lines showing the wheels in the narrow tread position.

As illustrated, the tractor has a narrow body portion 10 supported on a steerable front wheel 11. The narrow body extends to the rear of the tractor, housing in the casing 12 certain of the driving gears for the tractor. Said casing also provides for attaching the flanged axle housings 13 which extend laterally a substantial distance from the casing 10. These housings are extended as far as possible, depending upon the minimum tread necessary, it being, of course, desirable to support the axles 14, which extend from the housings, over as much of their length as possible. A drawbar 15 for connecting implements to the tractor is attached to annular flanges 16 formed on the axle housings 13. Each of the axles 14 extends a substantial, lateral distance from its housing 13. A keyway 17 is cut in each axle throughout its exposed portion.

The wheel as utilized is of a particular construction adapted for a variable tread tractor. A center section 18, annular in its general outline, is formed at circumferentially spaced locations with depressions to provide for attaching an outer series of spokes 19 and an inner series of spokes 20 at angles with respect to each other.

Two mating hub sections 21 complete the wheel. Each of said sections has a somewhat semi-cylindrical portion 22 extending along the axle 14. Said portion is formed with an integral key 23 which slidably fits the keyway 17 in the axle. Each hub section is also formed with laterally extended portions 24 provided with axially spaced holes 25 and with an integral semi-circular flange 26. This flange overlap the centermost portion of the center section 18 of the wheel and is permanently secured thereto by circular welds at each edge of the overlapped area. It will be noted, as best shown in Figure 4, that the hub sections are spaced apart at their adjacent sides along the axle 14. In line with this space, radial slits 27 are cut into the center section 18 of the wheel to provide the necessary resiliency for clamping the wheel in position. Bolts 28 are extended through the aligned openings in the hub sections 24.

As shown in Figure 3, the wheel is in its innermost position; that is, with the tread of the tractor at a minimum. Due to the construction utilized, in which the flanged hub section 21 are secured to the outside of the section 18 of the wheel with the attaching portions 22 extending axially away from the wheel, the wheel may be axially mounted over the outer end of the housing 13. This permits the use of an axle support of maximum width with a given minimum tread.

In adjusting the tread of the tractor without removing the wheels, the bolts 28 may be loosened whereby the wheel may be slid axially out to the end of the axle 14. There are no loose keys or other parts to be positioned during such an adjustment. If the maximum width of tread is desired, the wheels are removed and reversed with the hub sections in the position shown in Figure 1. By an offset construction of this type, a maximum tread may be obtained with a minimum length of axle, which is particularly desirable when using the tractor with the narrow tread, as the axles project from the wheels when in that position.

It is to be understood that applicant has shown and described only a preferred embodiment of his improved wheel construction and that he claims as his invention all modifications falling within the scope of the appended claim.

What is claimed is:

A wheel hub structure comprising a pressed steel annular hub plate, two spaced apart hub members each consisting of a clamping portion for engaging an axle and a substantially semi-annular flange extending from the clamping portion, said flanges being permanently secured to the hub plate, said hub plate being slotted outwardly from the center in line with the space between the clamping portions to provide flexibility for clamping said members on an axle, said hub plate being slotted only a portion of its radial width whereby sufficient rigidity is retained to withstand twisting and lateral strains, and means for engaging the clamping portions of the securing members with an axle.

EDWARD A. JOHNSTON.